United States Patent [19]

Yuzawa et al.

[11] Patent Number: 4,747,389
[45] Date of Patent: May 31, 1988

[54] CRANK ANGLE DETECTING SYSTEM FOR ENGINES

[75] Inventors: Haruo Yuzawa; Masafumi Nishiyama, both of Yokohama; Katsuyuki Nakamura, Yokosuka; Kazuhiro Ishigami, Yokohama, all of Japan

[73] Assignee: Nissan Motor Company, Limited, Kanagawa, Japan

[21] Appl. No.: 65

[22] Filed: Jan. 2, 1987

Related U.S. Application Data

[62] Division of Ser. No. 709,665, Mar. 8, 1985, Pat. No. 4,656,993.

[30] Foreign Application Priority Data

Mar. 14, 1984 [JP] Japan .................. 59-37182

[51] Int. Cl.$^4$ ................................ F02P 5/04
[52] U.S. Cl. ..................... 123/643; 123/613
[58] Field of Search ................. 123/643, 613

[56] References Cited

U.S. PATENT DOCUMENTS

| | | | |
|---|---|---|---|
| 4,112,895 | 9/1978 | Habert | 123/613 |
| 4,373,486 | 2/1983 | Nichols | 123/643 |
| 4,418,660 | 12/1983 | Endo et al. | 123/643 |
| 4,441,479 | 4/1984 | Endo et al. | 123/643 |
| 4,457,285 | 7/1984 | Hamai et al. | 123/643 |
| 4,459,968 | 7/1984 | Brandt | 123/643 |
| 4,493,306 | 1/1985 | Asik | 123/643 |
| 4,497,306 | 2/1985 | Hamai | 123/643 |
| 4,502,446 | 3/1985 | Kanegae et al. | 123/643 |
| 4,562,822 | 1/1986 | Ishikawa et al. | 123/643 |
| 4,572,151 | 2/1986 | Toyama | 123/643 |

*Primary Examiner*—Ronald B. Cox
*Attorney, Agent, or Firm*—Foley & Lardner, Schwartz, Jeffery, Schwaab, Mack, Blumenthal & Evans

[57] ABSTRACT

A crank angle detecting system for a multicylinder engine includes a disc formed with a large number of slits to detect one-degree crank angular positions and a small number of slits to detect a predetermined piston stroke for each cylinder. Since the widths of a small number of slits are different from each other, it is possible to separately discriminate each cylinder in crank angular position on the basis of the crank angle signals obtained by a large number of slits. In the case where the detecting system is incorporated with a group-ignition system, it is possible to detect a predetermined piston stroke for each cylinder immediately after the engine is started, thus preventing the engine from erroneous ignition.

6 Claims, 6 Drawing Sheets

FIG.1(A) (PRIOR ART)
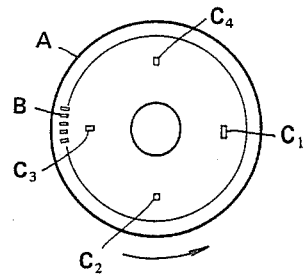
FIG.1(B) (PRIOR ART)
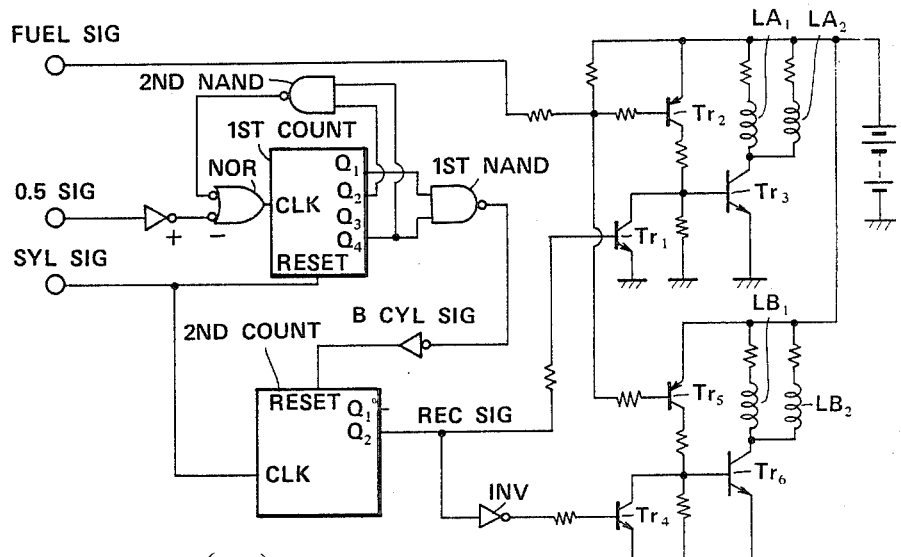
FIG.1(C) (PRIOR ART)
|  |  |  | ENGINE CYLINDERS | | | |
|---|---|---|---|---|---|---|
|  |  |  | $V_1$ (A) | $V_2$ (B) | $V_3$ (B) | $V_4$ (A) |
| CRANK REV. | I | PISTON STROKE | 1 | EXP. | EXH. | COMP. | INT. |
|  |  |  | 2 | EXH. | INT. | EXP. | COMP. |
|  | II |  | 3 | INT. | COMP. | EXH. | EXP. |
|  |  |  | 4 | COMP. | EXP. | INT. | EXH. |
EXP.: EXPANSION  EXH.: EXHAUST
INT.: INTAKE  COMP.: COMPRESSION

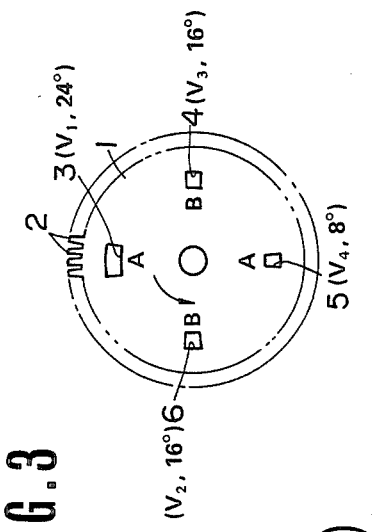
FIG. 3
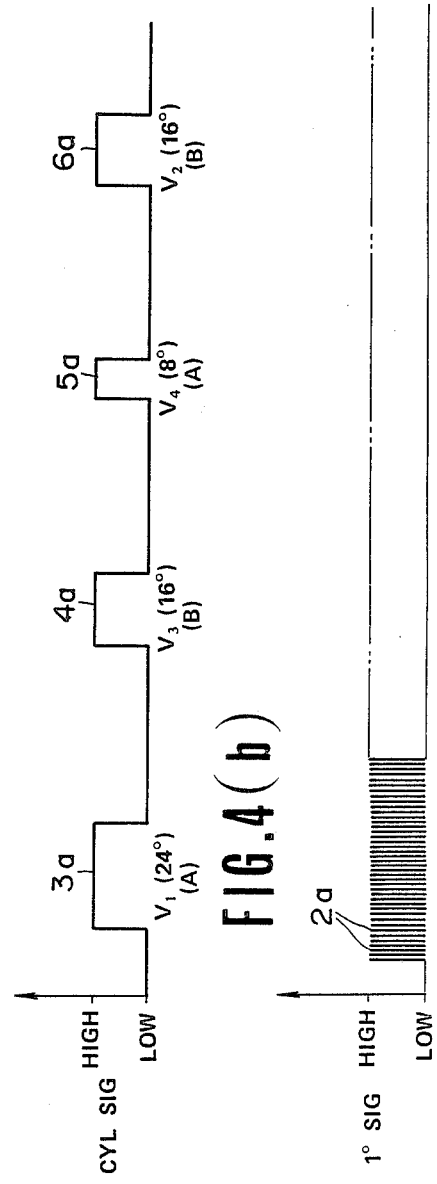
FIG. 4(a)
FIG. 4(b)

CRANK ANGLE DETECTING SYSTEM FOR ENGINES

This is a division of application Ser. No. 709,665, filed Mar. 8, 1985, now U.S. Pat. No. 4,656,993, issued 4-14-87.

BACKGROUND OF THE INVENTION

The present invention relates generally to a crank angle detecting system for an engine, and more particularly to a system for detecting a predetermined piston stroke for each cylinder on the basis of crankshaft angular position, particularly when a multi-cylinder engine is started, in order that fuel can be injected into or ignited within each cylinder separately or each group of cylinders simultaneously.

DESCRIPTION OF THE PRIOR ART

Recently, some electrical crank angle detecting systems have been proposed in place of conventional contact point opening/closing mechanisms arranged within a distributor. These detecting systems can electrically detect predetermined piston strokes (e.g. compression stroke) for each cylinder on the basis of crankshaft angular position. The system is incorporated with an ignition system or a fuel injection system for a multi-cylinder engine. In a certain ignition system, fuel is ignited within each group of cylinders simultaneously in response to each detected predetermined piston stroke. In a certain injection system, fuel is supplied into each group of cylinders simultaneously in response to each detected predetermined piston stroke.

The reason why the above-mentioned group fuel ignition or injection is necessary is as follows: In the usual fuel injection systems for engines, for instance, fuel is injected into all the cylinders simultaneously. However, in the case where the engine should be controlled more finely in order to purify exhaust gas or economize fuel, fuel should be injected into engine cylinders by classifying engine cylinders into some groups (e.g. two groups in a 4-cylinder engine; two-groups in a 6-cylinder engine; four-groups in an 8-cylinder engine).

For instance, Japan Published Examined Patent Application No. 40-8281 discloses an ignition system for an internal combustion engine including a crank angle detecting system. In this system, a rotating disc is rotatably connected to a crankshaft in synchronization with the crankshaft. The disc includes metallic sectors and nonmetallic sectors alternately. An electromagnetic sensor detects change in magnetic flux caused when the disc is rotating in order to detect a predetermined piston stroke for each cylinder on the basis of crankshaft angular position. In response to the detected electromagnetic sensor signal, each group of cylinders are ignited.

Further, Japan Published Unexamined Patent Application No. 57-8328 discloses an engine control system including a crank angle detecting system. In this system, a rotating disc is also rotatably connected to a crankshaft in synchronization with the crankshaft. The disc includes a plurality of cylinder detecting slits which can detect an upper dead center of each cylinder. A photoelectric sensor detects light passed through or shut off by the slits in order to detect a predetermined piston stroke for each cylinder on the basis of crankshaft angular position. In this system, the width of a first slit for detecting a predetermined piston stroke of the first cylinder is formed wider than that of the other slits for detecting predetermined piston strokes of the other cylinders. On the basis of the first cylinder signal detected by the photoelectric sensor in cooperation with the first slit, the other cylinder signals are detected in sequence in order to inject fuel into each group of cylinders. In more detail, a flip-flop is reset in response to the first cylinder signal, and thereafter outputs a rectangular pulse signal alternately in response to the cylinder signals to activate, in turn, two circuits classified into two cylinder groups. This prior-art engine control system (Japan No. 57-8328) will be described in more detail with reference to the attached drawings under DETAILED DESCRIPTION OF THE PREFERRED EMBODIMENTS.

In the prior-art crank angle detecting systems for engines as described above, there exist some drawbacks. The basic problems are: In the first example (Japan No. 40-8281), each cylinder group can be detected separately; however, it is impossible to detect each cylinder separately. That is to say, it is impossible to ignite each cylinder separately.

In the second example (Japan No. 57-8328), although a widest slit is formed in order to detect a specific (e.g. 1st cylinder) cylinder, the other cylinders are detected only after the specific cylinder has been detected. Therefore, it is impossible to discriminate the cylinder signals before the specific cylinder is detected, particularly when the engine is cranked or started. Therefore, fuel injection or ignition should be determined on some assumption, in the case where fuel is injected into or ignited within each cylinder separately or each group of cylinders simultaneously. When fuel is ignited, in particular, erroneous ignition may occur, resulting in back fire (mixture is ignited in intake stroke) or after fire (mixture included in exhaust gas is ignited in exhaust stroke). The above problems will deteriorate engine starting characteristics or may damage the engine.

SUMMARY OF THE INVENTION

With these problems in mind, therefore, it is the primary object of the present invention to provide a crank angle detecting system for an engine which can reliably detect a predetermined piston stroke for each cylinder or for each group of cylinders separately, immediately after the engine has been started.

To achieve the above-mentioned object, the crank angle detecting system for an engine according to the present invention comprises, in particular, a disc rotatably connected to a crankshaft and formed with a large number of slits and a small number of slits corresponding to engine cylinder in such a manner that widths of a small number of the slits are formed being different from each other at least between ignition groups to separately discriminate each cylinder or each cylinder group in crank angular position on the basis of crank angle signals obtained by a large number of slits in cooperation with a photoelectric sensor.

Further, in the case where the crank angle detecting system according to the present invention is incorporated with a group-ignition system, for instance, it is possible to ignite each cylinder or each cylinder group separately in response to cylinder signals detected by the crank angle detecting system immediately after the engine has been started.

BRIEF DESCRIPTION OF THE DRAWINGS

The features and advantages of the crank angle detecting system for an engine according to the present invention over the prior-art system will be more clearly appreciated from the following description of the preferred embodiments of the invention taken in conjunction with the accompanying drawings in which like reference numerals designate the same or similar elements or sections or waveforms throughout the figures thereof and in which:

FIG. 1(A) is a diagrammatical plane view showing a rotating disc connected to a crankshaft, which is provided for a prior-art crank angle detecting systems incorporated with an engine control system for supplying fuel into each cylinder group;

FIG. 1(B) is a schematic block diagram of the prior-art engine control system provided with the rotating disc shown in FIG. 1(A);

FIG. 1(C) is a table indicating one cycle of a four-cylinder engine having an ignition sequence of $V_1$-$V_3$-$V_4$-$V_2$, by way of example;

FIG. 3 is a diagrammatical plane view showing a rotating disc connected to a crankshaft, which is the same as the one (the first embodiment) shown in FIG. 2;

FIG. 4(a) is a waveform diagram indicating a series of cylinder signals obtained by the rotating disc shown in FIG. 3;

FIG. 4(b) is a waveform diagram indicating a series of one-degree crank angle signals obtained by the rotating disc shown in FIG. 3;

DETAILED DESCRIPTION OF THE PREFERRED EMBODIMENTS

Figure 2:
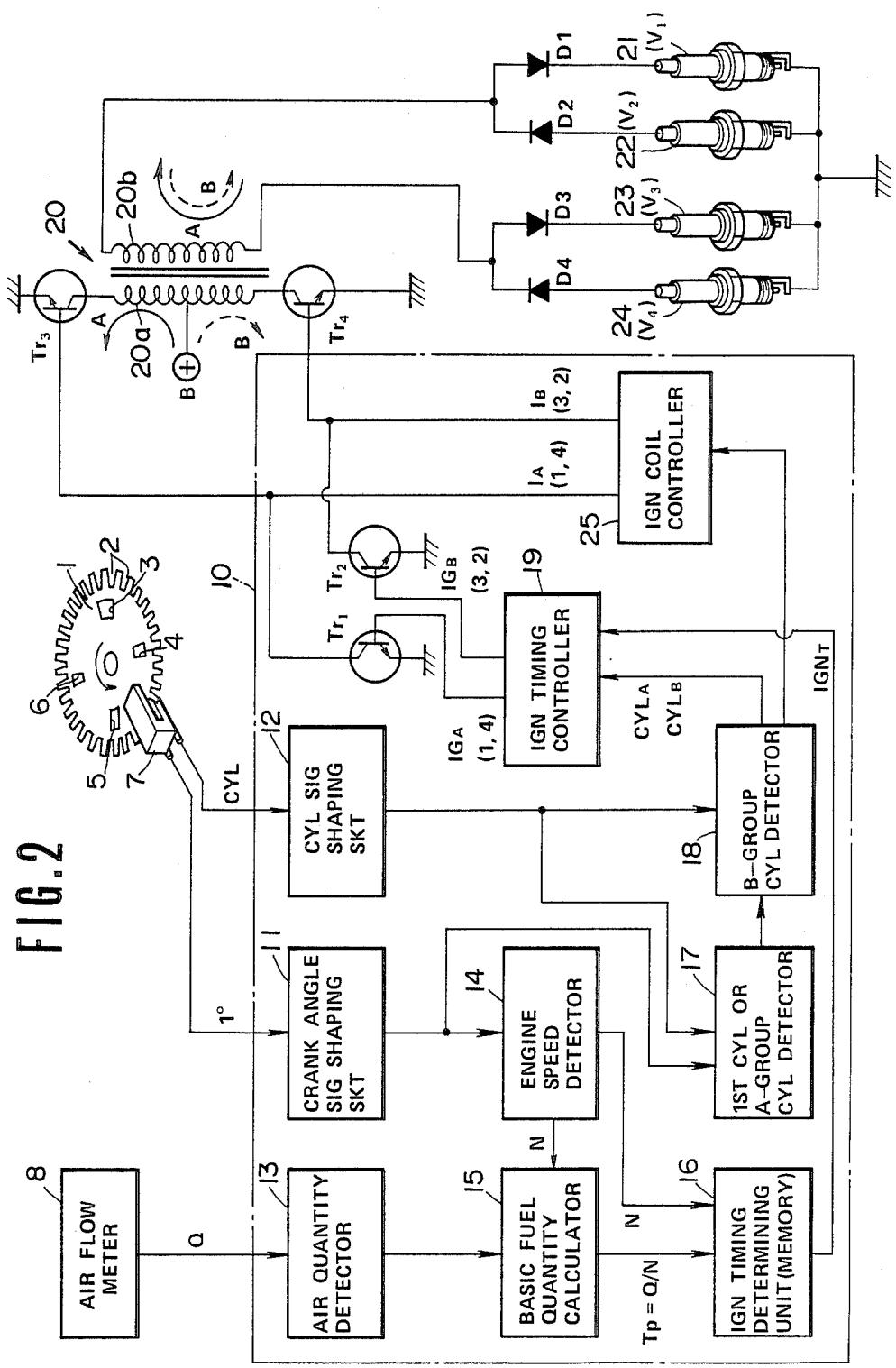
FIG. 2 is a schematic block diagram including a perspective view of a rotating disc of a first embodiment of the crank angle detecting system according to the present invention, which is incorporated with an engine ignition system by way of example.

To facilitate an understanding of the present invention, a brief reference will be made to a prior-art crank angular position sensing system with reference to the attached drawings.

Japan Published Unexamined Patent Application No. 57-8328 discloses an engine control system including a crank angle sensing system. In this system, an engine is so controlled that fuel is injected into engine cylinders being classified into two cylinder groups. In usual fuel injection systems for engines, fuel is injected into all the engine cylinders simultaneously. However, in the case where the engine should be controlled more finely from the standpoint of exhaust gas regulation or energy saving, it is necessary to control engine being classified into cylinder groups (two groups in 4-cylinder engine, for instance).

FIG. 1(A) shows a disc A disposed in a distributor (not shown) for sensing crank angle signals and cylinder signals. A large number of open slits B arranged along the outer periphery of the disc A detect the crank angular positions. Four slits $C_1$ to $C_4$ arranged at 90 degree angular intervals in the disc A detect cylinder signals. In these four slits $C_1$ to $C_4$, only the slit $C_1$ is formed wider than the other slits $C_2$ $C_3$ and $C_4$. This is because the slit $C_1$ detects a basic or specific cylinder signal. Further, although not shown, two photoelectric sensors are so disposed as to detect light passed through or shut off by the slits B and $C_1$ to $C_4$ in such a way that the outer open slits B detect crank angle signals of 0.5 degrees, the widest slit $C_1$ detects a cylinder signal of 5 degrees, and the three slits $C_2$, $C_3$ and $C_4$ detect three cylinder signals of 3.5 degrees all in crank angle whenever the disc A rotates through one revolution.

The four cylinder signals detect each top dead center of each cylinder in crank angle or distributor angle in the case of a four cylinder engine. On the basis of the cylinder signals (CYL SIG) detected by the slits $C_1$ to $C_4$ and the crank angle signals (0.5 SIG) detected by the slits B, fuel is injected into each cylinder being classified into two cylinder groups. The presence or absence of the basic cylinder signal produced by the widest slit $C_1$ can be determined by counting the crank angle signals (0.5 SIG) which occur when the basic cylinder signal is being detected. In this prior-art system, when ten 0.5-degree signals have been counted during detection of a cylinder signal, the basic cylinder signal (5 degrees) produced by the widest slit $C_1$ is indicated. Thereafter, each cylinder signal (3.5 degrees) is detected in sequence.

With reference to FIG. 1(B), the operation of this system is described in more detail hereinbelow. The assumption is made that the cylinder signals (CYL SIG) and the crank angle signals (0.5 SIG) are at a low voltage level when the photoelectric sensor detects light passed through the slits B and $C_1$ to $C_4$, and a first counter is reset in response to a high voltage level signal. When the cylinder signal applied to the reset terminal of the first counter changes to a low voltage level (the slit is detected), the first counter begins to count the crank angle signal (0.5 SIG) applied to the CLK terminal thereof via an inverter and a NOR gate. If the first counter counts nine crank angle (CLK) signals, a first NAND gate outputs a high voltage level signal. However, if the first counter counts ten crank angle (CLK) signals, the first NAND gate outputs a low voltage level signal; a second NAND gate also outputs a low voltage level signal; the clock signals (0.5 SIG) change to a high level via a NOR gate, so that the first counter stops counting. Thereafter, if the cylinder signal changes to a high voltage level (the slit is not detected), the first counter is reset for standing-by the counting of the succeeding crank angle signals (0.5 SIG). In summary, when the first counter counts ten crank angle signals, a basic cylinder discriminating signal (B CYL SIG) of a high voltage level is generated.

The operation of cylinder-classified fuel injection will be described hereinbelow. The basic cylinder signal (B CYL) is applied to the reset terminal of a second counter, after having been inverted to reset the second counter. That is to say, the second counter is synchronized with the basic cylinder signal. Since the cylinder signals are sequentially applied to the CLK terminal of the second counter, the second counter outputs a rectangular signal such that the voltage level is high in response to the slit $C_2$, but low in response to the slit $C_4$. In the response to this rectangular signal, either the first or the fourth transistor is turned on or off alternately. For instance, while the first transistor $Tr_1$ is turned on in response to the high level rectangular signal (REC SIG), even if the second transistor $Tr_2$ is turned on in response to a fuel injection signal (FUEL SIG), a third power transistor $Tr_3$ is kept off, so that two injection coils $LA_1$ and $LA_2$ are not energized. However, when the rectangular signal (REC SIG) changes to a low voltage level, the second transistor is turned off; since the second transistor $Tr_2$ is kept turned on; the third transistor $Tr_3$ is turned on, so that the two injection coils $LA_1$ and $LA_2$ are energized simultaneously. Since an inverter is connected between the second counter and the four transistor $Tr_4$, the transistors $Tr_1$ and $Tr_4$ are turned on or off alternately.

With reference to FIG. 1(C), an example of group ignition will be described hereinbelow. FIG. 1(C) shows a table representative of the piston stroke during one cycle of a four-cylinder engine having an ignition sequence of $V_1$-$V_3$-$V_4$-$V_2$. The cylinders $V_1$ and $V_4$ are classified as group A; the cylinders $V_2$ and $V_3$ are classified as group B. The above classification can be applied to the case where the ignition sequence is $V_1$-$V_2$-$V_4$-$V_3$. Further, in the case where the ignition sequence is $V_1$-$V_4$-$V_3$-$V_2$ or $V_1$-$V_2$-$V_3$-$V_4$, the cylinders $V_1$ and $V_3$ are classified as group A;' the cylinders $V_2$ and $V_4$ are classified as group B.

When the cylinders $V_1$ and $V_4$ are ignited simultaneously at piston stroke 4 in FIG. 1(C), for instance, although the cylinder $V_1$ is ignited because of the compression stroke, the cylinder $V_4$ is not ignited because of exhaust stroke in which the cylinder $V_4$ is filled up with a mixture which has already been burnt out.

In view of the above description, reference is now made to a first embodiment of the crank angle sensing system for an engine according to the present invention. FIG. 2 shows an ignition system for a four-cylinder engine having an ignition sequence of $V_1$-$V_3$-$V_4$-$V_2$, by way of example, in which the first embodiment according to the present invention is incorporated with the ignition system. The first cylinder $V_1$ and the fourth cylinder $V_4$ are classified as group A; the third cylinder $V_3$ and the second cylinder $V_2$ are classified as group B.

The system shown in FIG. 2 comprises roughly a rotating disc 1, a photoelectric sensor 7, an airflow meter 8, a control unit 10, an ignition coil unit 20 including two power transistors $Tr_3$ and $Tr_4$ and four ignition plugs 21 to 24.

The rotating disc 1 is disposed within a distributor (not shown). That is, a disc shaft is rotatably connected to a crankshaft through a cam shaft, so that the rotating disc 1 rotates half revolution in synchronization with the crankshaft whenever the crankshaft rotates one revolution. As depicted more clearly in FIG. 3, the rotating disc 1 is formed with a large number of open crank angle detecting slits 2 and four cylinder detecting slits 3, 4, 5 and 6. The open crank angle detecting slits 2 are formed along the outer circumference of the disc 1 at regular angular intervals corresponding to one degree in crank shaft angular position. Since the revolution speed of the disc 1 is half of that of the crankshaft, 720 crank angle detecting slits 2 are formed along the outer circumference of the disc 1.

The four cylinder detecting slits 3, 4, 5 and 6 are arranged at 90-degree angular intervals in the reverse direction of the rotating disc 1 so as to detect the ignition sequence of the engine cylinders as follows: The widest slit 3 with an angular width of 24° in crankshaft angle corresponds to the first cylinder $V_1$; the medium slit 4 with an angular width of 16° in crankshaft angle corresponds to the third cylinder $V_3$; the narrowest slit 4 with an angular width of 8° in crankshaft angle corresponds to the fourth cylinder $V_4$; the medium slit 6 with an angular width of 16° (the same as the slit 4) in crankshaft angle corresponds to the second cylinder $V_2$. Therefore, the slits 3 and 5 corresponding to cylinders $V_1$ and $V_4$ are classified as group A; the slits 4 and 6 corresponding to cylinders $V_3$ and $V_2$ are classified as group B.

The photoelectric sensor 7 is so disposed that the rotating disc 1 is put between a tuning fork shaped portion thereof as depicted in FIG. 2. The sensor 7 includes two pairs of light-emitting elements (e.g. light-emitting-diode) and light-receiving elements (e.g. phototransistor). The first pair thereof is disposed so as to detect light passed through (e.g. high voltage level) or shut off (e.g. low voltage level) by the crank angle detecting slits 2, that is, one-degree crank angle signals (1° SIG) 2a. The second pair thereof is disposed so as to detect light passed through (e.g. high voltage level) or shut off (e.g. low voltage level) by the cylinder detecting slits 3, 4, 5 and 6, that is, four cylinder signals (CYL SIG) 3a, 4a, 5a and 6a.

With reference to FIG. 2, the control unit 10 includes a crank angle signal shaping circuit 11, a cylinder signal shaping circuit 12, an air quantity detector 13, an engine speed detector 14, a basic fuel quantity calculator 15, an ignition timing determining unit including memory unit 16, a first cylinder (A-group cylinder) detector 17, a B-group cylinder detector 18, an ignition timing controller 19, and an ignition coil controller 25, and two transistors $Tr_1$ and $Tr_2$.

The crank angle signal shaping circuit 11 connected to the photoelectric sensor 7 shapes the waveform of the crank angle signals (1° SIG) into that as depicted in FIG. 4(b). The cylinder signal shaping circuit 12 connected to the photoelectric sensor 7 shapes the waveform of the cylinder signals (CYL SIG) into that as depicted in FIG. 4(a). Each cylinder signal rises or changes to a high voltage level at 110 degrees in crank angle before each top dead center of each cylinder and falls or changes to a low level with pulse widths corresponding to each slit angular widths (24°, 16°, 8°, 16°).

The air quantity detector 13 connected to the airflow meter 8 detects the quantity of air introduced into the engine and outputs digital signals corresponding thereto. The engine speed detector 14 connected to the crank angle signal shaping circuit 11 detects engine speed N on the basis of the crank angle signal (1° SIG). The basic fuel quantity calculator 15 calculates a basic quantity (Tp=Q/N) of fuel to be supplied into the engine on the basis of the quantity of intake air Q detected by the air quantity detector 13 and the engine speed N detected by the engine speed detector 14. The ignition timing determining unit 16 reads appropriate ignition timings from a table stored in a memory unit included therein, in accordance with a table look-up method, on the basis of the calculated basic quantity of fuel Tp and the detected engine speed N.

The ignition timing controller 19 connected to the B-group cylinder detector 18 and the ignition timing determining unit 16 generates a first ignition signal $IG_A$ in response to an ignition timing signal $IGN_T$ only while the first cylinder signal 3a or the fourth cylinder signal 5a (Group A) is detected, in order to turn on the first transistor $Tr_1$. The controller 19 further generates a second ignition signal $IG_B$ in response to an ignition timing signal $IGN_T$ only while the third cylinder signal 4a or the second cylinder signal 6a (Group B) is detected, in order to turn on the second transistor $Tr_2$.

The ignition coil controller 25 connected to the B-group cylinder detector 18 generates a first ignition coil current signal $I_A$ when the first cylinder signal 3a or the fourth cylinder signal 5a (A-group) is detected or changes to a high voltage level (110 degrees before the top dead center) for a predetermined time period and a second ignition coil current signal $I_B$ when the third cylinder signal 4a or the second cylinder signal 6a (B-group) is detected or changes to a high voltage level (110 degrees before the top dead center) for a predetermined time period.

The ignition coil unit 20 includes a primary coil 20a and a secondary coil 20b. The middle of the primary coil 20a is connected to a battery B. One end of the primary coil 20a is connected to the collector of a third (power) transistor $Tr_3$ and the other end of the primary coil 20a is connected to the collector of a fourth (power) transistor $Tr_4$. One end of the secondary coil 20b is connected to a first ignition plug 21 via a first diode $D_1$ and to a second ignition plug 22 via a second diode $D_2$ in parallel with each other but in the reverse direction; the other end of the secondary coil 20b is connected to a third ignition plug 23 via a third diode $D_3$ and to a fourth ignition plug 24 via a fourth diode $D_4$ in parallel with each other but in the reverse direction.

Further, the base of the third transistor $Tr_3$ is connected to the collector of the first transistor $Tr_1$ and the ignition coil controller 25 to receive the first ignition coil current signal $I_A$ and the first ignition signal $IG_A$. The base of the fourth transistor $Tr_4$ is connected to the collector of the second transistor $Tr_2$ and the ignition coil controller 25 to receive the second ignition coil current signal $I_B$ and the second ignition signal $IG_B$.

The operation of the ignition system including the crank angle sensing system according to the present invention will be described hereinbelow.

When an ignition key switch is turned on, the light-emitting diodes disposed in the photoelectric sensor 7 are activated. Simultaneously, the engine is cranked and the rotating disc 1 rotates in synchronization with the crankshaft. In this embodiment, whenever the crankshaft rotates one revolution (360°), the rotating disc 1 rotates a half revolution (180°). The photoelectric sensor 7 generates crank angle signals (1° SIG) and four cylinder signals (CYL SIG). In response to the crank angle signals, the crank angle signal shaping circuit 11 outputs a crank angle pulse signal 2a as shown in FIG. 4(b). In response to the cylinder signals, the cylinder signal shaping circuit 12 outputs four cylinder pulse signal 3a, 4a, 5a, and 6a as shown in FIG. 4(a). The signal 3a is obtained by the widest slit 3 of 24° for detecting the first cylinder $V_1$ as group A; the signal 4a is obtained by the medium slit 4 of 16° for detecting the third cylinder $V_3$ as group B; the signal 5a is obtained by the narrowest slit 5 of 8° for detecting the fourth cylinder $V_4$ as group A; and the signal 6a is obtained by the medium slit 6 of 16° for detecting the second cylinder $V_2$ as group B. In response to the crank angle signal and the cylinder signals, the first cylinder or A-group cylinder detector 17 detects the crankshaft angular position range in which the first cylinder $V_1$ or the A-group cylinders $V_1$ and $V_4$ should be ignited. Further, in response to the same signals, the B-group cylinder detector 18 detects the crankshaft angular position range in which the third cylinder $V_3$ or the second cylinder $V_2$ or the B-group cylinders should be ignited. Each cylinder group is determined by counting each pulse width of the cylinder signals on the basis of the crank angle signal as described later in more detail. The B-group cylinder detector 18 outputs an A-group cylinder signal $CYL_A$ or a B-group cylinder signal $CYL_B$ representative of each discriminated crankshaft angular position range within which each cylinder should be ignited.

On the other hand, in response to the crank angle signal (1° SIG), the engine speed detector 14 detects engine speed N and outputs a signal corresponding thereto. The airflow meter 8 detects the quantity Q of intake air introduced into each cylinder and outputs an analog signal corresponding thereto. In response to this analog signal, the air quantity detector 13 outputs a digital signal representative of the quantity Q of the intake air. In response to the engine speed N and the intake air quantity Q, the basic fuel quantity calculator 15 calculates a value $Tp=Q/N$. In response to this calculated basic fuel quantity $Tp=Q/N$ and the detected engine speed N, the ignition timing determining unit 16 selects an appropriate ignition timing from a table previously stored in a memory unit provided therewithin in accordance with a table look-up method and outputs an ignition timing signal $IGN_T$. The above signal $IGN_T$ determines appropriate ignition advance angles under consideration of engine speed and engine load (detected by the airflow meter 8). In response to the A-group and B-group cylinder signals $CYL_A$ and $CYL_B$ and the ignition timing signal $IGN_T$, the ignition timing controller 19 outputs an A-group ignition signal $IG_A$ and a B-group ignition signal $IG_B$. Since each cylinder signals 3a, 4a, 5a, and 6a rises or changes to a high-voltage level 110 degrees (in crank angle) before the top dead center of each cylinder, it is possible to determine each ignition timing on the basis of the leading edge of each cylinder signal. That is, the ignition timing is a delay time from the leading edge of the cylinder signal.

Further, in response to the leading edge of the cylinder signals 3a and 5a (A-group), the ignition coil controller 25 outputs an A-group coil current signal $I_A$ for a predetermined time period. In response to the leading edge of the cylinder signals 4a and 6a (B-group), the ignition coil controller 25 outputs a B-group coil current signal $I_B$ for a predetermined time period.

The ignition coil 20 is energized or deenergized as follows: In response to the A-group coil current signal $I_A$, the third (power) transistor $Tr_3$ is turned on, so that current is passed through the primary coil 20a of the ignition coil 20 from the battery to the ground via the transistor $Tr_3$ as shown by the solid line A. While the transistor $Tr_3$ is kept on, if an A-group ignition signal $IG_A$ is applied to the base of the transistor $Tr_1$, $Tr_1$ is turned on to drop the base potential of $Tr_3$ to zero, that is, to turn off $Tr_3$. The instant $Tr_3$ is turned off, a high voltage is developed across the secondary coil 20b of the ignition coil 20, so that an arc current is passed by way of the diode $D_1$, the ignition plug 21, the ignition plug 24, and the diode $D_4$, as shown by the solid line A, to activate the A-group ignition plugs 21 and 24 simultaneously.

In contrast with this, in response to the B-group coil current signal $I_B$, the fourth (power) transistor $Tr_4$ is turned on, so that current is passed through the primary coil 20a of the ignition coil 20 from the battery to the ground via the transistor Tr4 as shown by the dashed line B. While the transistor Tr4 is kept turned on, if a B-group ignition signal $IG_B$ is applied to the base of the transistor Tr2, Tr2 is turned on to drop the base potential of tr4 to zero, that is, to turn off Tr4. The instant Tr4 is turned off, a high voltage is developed across the secondary coil 20b of the ignition coil 20, so that an arc current is passed by way of the diode $D_3$, the ignition plug 23, the ignition plug 22 and the diode $D_2$, as shown by the dashed line B, to activate the B-group ignition plugs 22 and 23 simultaneously.

Figure 5:
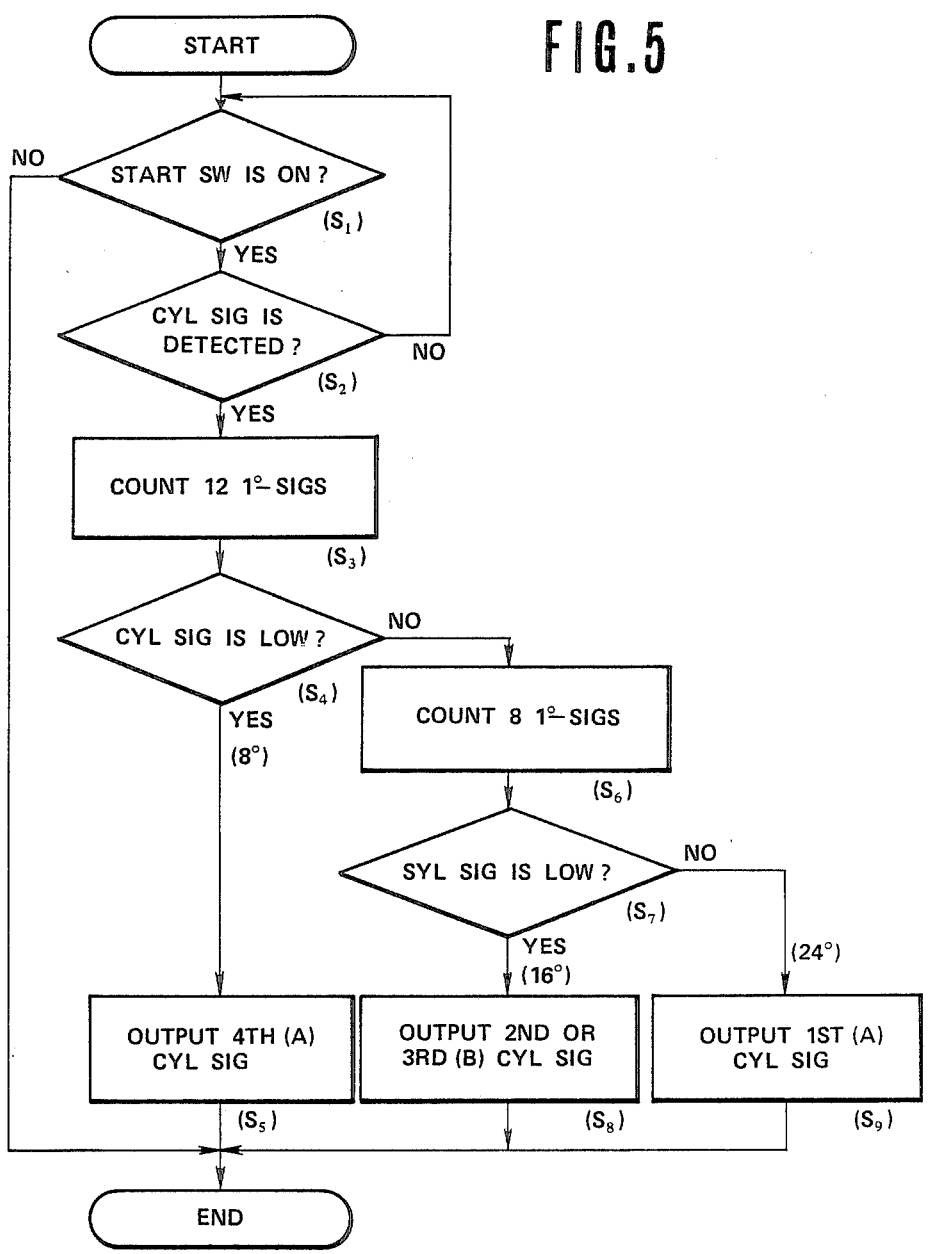
FIG. 5 is a control flowchart for discriminating each cylinder or each cylinder group in the control unit (the first embodiment) shown in FIG. 2.

The operation of the first-cylinder or A-group cylinder detector 17 and the B-group cylinder detector 18 will be described in more detail with reference to a control flowchart shown in FIG. 5.

Control first checks whether or not the engine starting switch is turned on or off (in step $S_1$). If off, control program ends without implementing any other operations. If on, control checks whether the cylinder signal 3a, 4a, 5a or 6a is detected or not (in step $S_2$). If not detected, control returns to the step $S_1$. If any one of the cylinder signals is detected, control counts the crank angle signal (1° SIG) by 12 pulses the instant the cylinder signal is detected (in step $S_3$). Control checks whether the detected cylinder signal is at a low voltage level or not when the 12 crank angle pulse signals (12 degrees) have been counted (in step $S_4$). If at a low voltage level, the cylinder signal is determined to be the fourth cylinder signal 5a detected through the slit 5 having a width corresponding to 8 degrees in crank angle, because the other three cylinder signals 3a, 4a and 6a have a pulse width (16°, 24°) wider than 12 degrees in crank angle. Therefore, the fourth cylinder signal or the A-group cylinder signal $CYL_A$ is outputted (in step $S_5$). If at a high voltage level (in step $S_4$), control further counts the crank angle signal (1° SIG) by additional 8 pulses (20 pulses in total) (in step $S_6$) and checks again whether the detected cylinder signal 3a, 4a or 6a is at a low voltage level or not when the 8 crank angle pulse signals have additionally been counted (in step $S_7$). If at a low voltage level, the cylinder signal is determined to be the third signal 4a or the second signal 6a obtained by the slit 4 or 6 having a width corresponding to 16 degrees in crank angle, because the other cylinder signal 3a has a pulse width (24°) wider than 20 degrees (in total) in crank angle. Therefore, the second or third cylinder signal or B-group cylinder signal $CYL_B$ is outputted (in step $S_8$). If at a high voltage level (in step $S_7$), the cylinder signal is determined to be the first signal 3a obtained by the slit 3 having a width corresponding to 24 degrees in crank angle. Therefore, the first cylinder signal or A-group cylinder signal $CYL_A$ is outputted (in step $S_9$).

Figure 6:
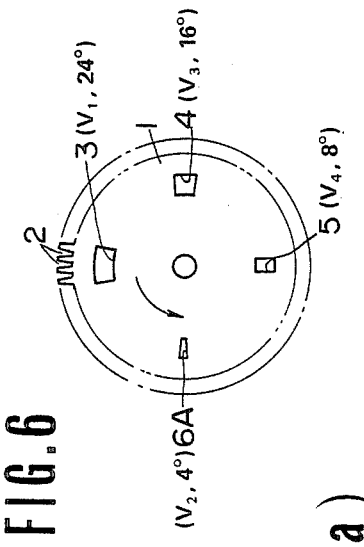
FIG. 6 is a diagrammatical plane view showing a rotating disc connected to a crankshaft, similarly to FIG. 3, which is a second embodiment of the crank angle detecting system according to the present invention.

FIG. 6 shows a rotating disc used for a second embodiment of the crank angle sensing system for an engine according to the present invention. In this embodiment, the crankshaft angular positions of four cylinders are not detected being classified into two groups A and B, but detected separately. The rotating disc 1 is formed with a plurality of open crank angle detecting slits 2 and four cylinder detecting slits 3, 4, 5, and 6A. The open crank angle detecting slits 2 are formed along the outer circumference of the disc 1 at regular angular intervals corresponding to one degree in crank angle.

Figure 7A:
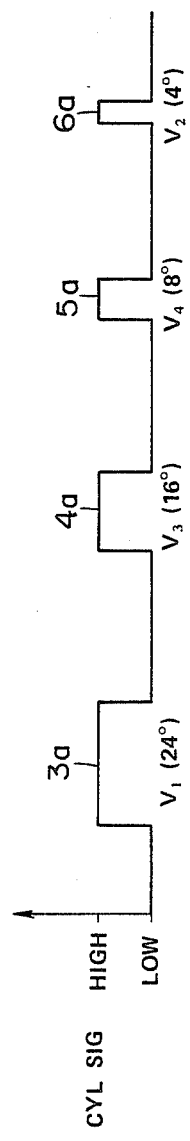
FIG. 7(a) is a waveform diagram indicating a series of cylinder signals obtained by the rotating disc shown in FIG. 6, similarly to FIG. 4(a)
Figure 7B:
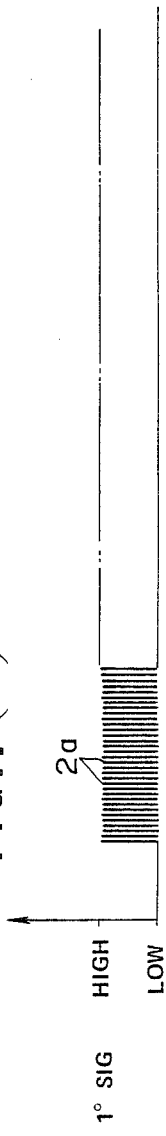
FIG. 7(b) is a waveform diagram indicating a series of one-degree crank angle signals obtained by the rotating disc shown in FIG. 6, similarly to FIG. 4(b)

The four cylinder detecting slits 3, 4, 5 and 6A are arranged at 90 degree angular intervals in the reverse direction of the rotating disc 1 so as to detect the ignition sequence of the engine as follows: The first widest slit 3 with an angular width of 24 degrees in crank angle detects the first cylinder $V_1$; the second slit 4 with an angular width of 16 degrees in cranks angle detects the third cylinder $V_3$; the third slit 5 with an angular width of 8 degrees in crank angle detects the fourth cylinder $V_4$; the fourth narrowest slit 6A with an angular width of 4 degrees in cranks angle detects the second cylinder $V_2$. That is to say, being different from the first embodiment, the narrowest slit 6A is formed in place of the medium slit 6. Further, FIG. 7(a) shows four cylinder signals 3a, 4a, 5a and 6a'. The first cylinder signal 3a is obtained by the first slit 3 (24°); the third cylinder signal 4a is obtained by the second slit 4(16°); the fourth cylinder signal 5a is obtained by the third slit 5(8°); the second cylinder signal 6a' is obtained by the fourth slit 6A(4°).

In this second embodiment, the control unit 10 shown in FIG. 2 includes a cylinder detector (not shown) in place of the first cylinder or A-group cylinder detector 17 and the B-group cylinder detector 18 in order that each cylinder can be discriminated separately, without classifying the cylinders into two groups.

Figure 8:
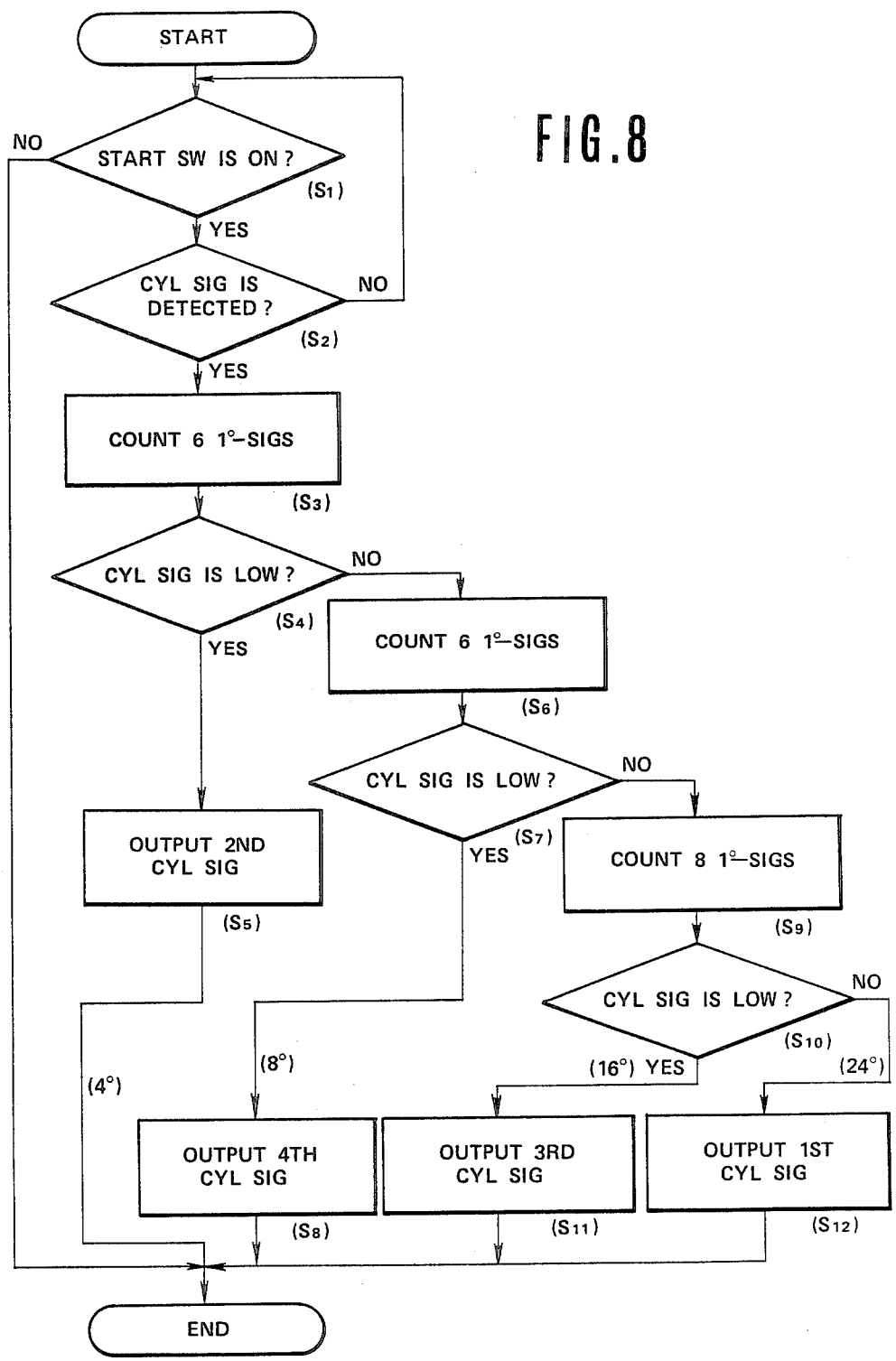
FIG. 8 is a control flowchart for discriminating each cylinder in the control unit (the second embodiment) similarly to FIG. 5.

The operation of the above-mentioned cylinder detector will be described in detail with reference to a control flowchart shown in FIG. 8.

Control first checks whether or not the engine starting switch is turned on or off (in step $S_1$). If off, control program ends without implementing any other operations. If on, control checks whether the cylinder signal 3a, 4a, 5a or 6a' is detected or not (in step $S_2$). If not detected, control returns to the step $S_1$. If any one of the cylinder signals is detected, control counts the crank angle pulse signals (1° SIG) by 6 pulses the instant the cylinder signal is detected (in step $S_3$). Control checks whether the detected cylinder signal is at a low voltage level or not when the 6 crank angle pulse signals (6 degrees) have been counted (in step $S_4$). If at a low voltage level, the cylinder signal is determined to be the second cylinder signal 6a' detected through the slit 6a having a width corresponding to 4 degrees in crank angle, because the other three cylinder signals 3a, 4a and 5a have a pulse width (24°, 16°, 8°) wider than 6 degrees. Therefore, the second cylinder signal ($CYL_2$) is outputted (in step $S_5$). If at a high voltage level (in step $S_4$), control further counts the crank angle signals (1° SIG) by additional 6 pulses (12 pulses in total) (in step $S_6$) and checks again whether the detected cylinder signal 3a, 4a or 5a is at a low voltage level or not when the 6 crank angle pulse signals have additionally been counted (in step $S_7$). If at a low voltage level, the cylinder signal is determined to be the fourth signal 5a obtained by the slit 5 having a width corresponding to 8 degrees in crank angle, because the other cylinder signal 3a or 4a has a pulse width (16°, 24°) wider than 12 degrees (in total) in crank angle. Therefore, the fourth cylinder signal $CYL_4$ is outputted (in step $S_8$). If at a high voltage level (in step $S_7$), control counts the crank angle pulse signals by additional 8 pulses (20 pulses in total) (in step $S_9$) and checks again whether the detected cylinder signal 3a or 4a is at a low voltage level or not when 8 crank angle pulse signals have additionally been counted (in step $S_{10}$). If at a low voltage level, the cylinder signal is determined to be the third signal 4a obtained by the slit 4 having a width corresponding to 16 degrees in crank angle, because the other cylinder signal 3a has a pulse width (24°) wider than 20 degrees (in total) in crank angle. Therefore, the third cylinder signal $CYL_3$ is outputted (in step $S_{11}$). If at a high voltage level (in step $S_{10}$), the cylinder signal is determined to be the first signal 3a obtained by the slit 3 having a width corresponding to 24 degrees in crank angle. Therefore, the first cylinder signal $CYL_1$ is outputted (in step $S_{12}$).

As described above, in the crank angle detecting system for a multi-cylinder engine according to the present invention, since a disc rotatably connected to a crankshaft is formed with a large number of slits to detect one-degree crank angular position and a small number of slits to detect a predetermined piston stroke for each cylinder in such a way that the widths of a small number of slits are different from each other at least between ignition groups, it is possible to separately discriminate each cylinder in crank angular position on the basis of the crank angle signals. Further, in the case where the crank angle detecting system according to the present invention is incorporated with a group-ignition system for instance, it is possible to ignite each cylinder or each cylinder group separately in response to cylinder signals detected by the crank angle detecting system immediately after the engine has been started.

What is claimed is:

1. An ignition system for a multi-cylinder internal combustion engine, comprising:
   (a) a plurality of engine cylinders in which spark plugs are installed respectively, said cylinders being classified into a plurality of groups and each group being constituted by a pair of cylinders such that while the one cylinder is in an explosive stroke, the other is in an exhaust stroke;
   (b) indicating means disposed so as to synchronize with an engine crankshaft and formed with a large number of slits and a small number of slits, the large number of slits being provided for indicating crankshaft angular positions and the small number of slits being provided for indicating predetermined piston strokes and wherein said small number of slits have mutually different widths from each other to distinguish between piston strokes of at least the groups of cylinders;
   (c) sensing means for sensing crankshaft angular positions in cooperation with the large number of slits of the indicating means and outputting a crank angle signal representing the crankshaft angular position and for sensing the predetermined piston strokes in cooperation with the small number of slits and outputting different width piston stroke signals corresponding to said different width slits;
   (d) discriminating means for identifying each cylinder group and outputting cylinder group identification signals on the basis of the different width stroke signals derived from the sensing means;
   (e) ignition timing determining means for generating an ignition timing signal on the basis of the crank angle signal;
   (f) ignition coil controlling means for generating ignition coil current signals corresponding to said cylinder group identification signals; and
   (g) ignition timing controlling means for generating cylinder group ignition signals in response to the ignition coil current signals and ignition timing signal so that the spark plugs of each cylinder group are ignited at a proper time.

2. An ignition system for a multi-cylinder engine, comprising:
   (a) a plurality of engine cylinders in which spark plugs are installed respectively, said cylinders being classified into a plurality of groups and each group being constituted by a pair of cylinders such that while the one cylinder is in an explosive stroke, the other is in an exhaust stroke;
   (b) indicating means disposed so as to synchronize with an engine crankshaft and formed with a large number of slits and a small number of slits, the large number of slits being provided for indicating crankshaft angular positions and the small number of slits being provided for indicating predetermined piston strokes and wherein said small number of slits have mutually different widths from each other to distinguish between piston strokes of at least the groups of cylinders;
   (c) sensing means for sensing crankshaft angular positions in cooperation with the large number of slits of the indicating means and outputting a crank angle signal representing the crankshaft angular position and for sensing the predetermined piston strokes in cooperation with the small number of slits and outputting different width piston stroke signals corresponding to said different width slits;
   (d) discriminating means for identifying each cylinder group and outputting cylinder group identification signals on the basis of the different width stroke signals derived from the sensing means; and
   (e) plug igniting means for igniting spark plugs separately on the basis of the group identification signals and crank angle signal.

3. An ignition system for a multi-cylinder internal combustion engine, comprising:
   (a) a plurality of engine cylinders in which spark plugs are installed respectively, said cylinders being classified into a plurality of groups and each group being constituted by a pair of cylinders such that while the one cylinder is in an explosive stroke, the other is in an exhaust stroke;
   (b) indicating means disposed so as to synchronize with an engine crankshaft and formed with a large number of slits and a small number of slits, the large number of slits being provided for indicating crankshaft angular positions and the small number of slits being provided for indicating predetermined piston strokes and wherein said small number of slits have mutually different widths;
   (c) sensing means for sensing crankshaft angular positions in cooperation with the large number of slits of the indicating means and outputting a crank angle signal representing the crankshaft angular position and for sensing the predetermined piston strokes in cooperation with the small number of slits and outputting different width piston stroke signals corresponding to said different width slits;
   (d) discriminating means for identifying each cylinder group and outputting cylinder group identification signals on the basis of the different width stroke signals derived from the sensing means;
   (e) ignition timing determining means for generating an ignition timing signal on the basis of the crank angle signal;
   (f) ignition coil controlling means for generating ignition coil current signals corresponding to said cylinder group identification signals; and (g) ignition timing controlling means for generating cylinder group ignition signals in response to the ignition coil current signals and ignition timing signal so that the spark plugs of each cylinder group are ignited at a proper time.

4. The ignition system as recited in claim 1, wherein the ignition timing controlling means includes at least one ignition coil connected to each spark plug.

5. The ignition system as recited in claim 4, wherein the cylinders are classified into two groups in a four-cylinder engine and wherein the ignition coil controlling means generates a first ignition coil current signal in response to a first-group cylinder identification signal and generates a second ignition coil current signal in response to a second-group identification signal.

6. The ignition system as recited in claim 5, wherein the ignition timing controlling means generates a first-group ignition signal in response to the first-group cylinder identification signal and the ignition timing signal and generates a second-group ignition signal in response to the second-group cylinder identification signal and ignition timing signal and the ignition coil means is connected to first-group spark plugs via a pair of first-group diodes and second-group spark plugs arranged in parallel with the first-group spark plugs via a pair of second-group diodes and which further comprises switching means for energizing the ignition coil means in response to the first and second ignition coil current signals and for deenergizing the ignition coil means in response to the first- and second-group ignition signals to ignite the spark plugs separately.

* * * * *